(12) United States Patent
Butler

(10) Patent No.: US 8,417,432 B2
(45) Date of Patent: Apr. 9, 2013

(54) METHOD FOR CALCULATING CONFIDENCE ON PREDICTION IN FAULT DIAGNOSIS SYSTEMS

(75) Inventor: Steven Wayne Butler, Columbia, CT (US)

(73) Assignee: United Technologies Corporation, Hartford, CT (US)

( * ) Notice: Subject to any disclaimer, the term of this patent is extended or adjusted under 35 U.S.C. 154(b) by 1109 days.

(21) Appl. No.: 12/112,021

(22) Filed: Apr. 30, 2008

(65) Prior Publication Data

US 2009/0276136 A1 Nov. 5, 2009

(51) Int. Cl.
*G06F 19/00* (2006.01)
*G06F 11/07* (2006.01)
*G06F 11/30* (2006.01)
*G01M 15/14* (2006.01)

(52) U.S. Cl. ..... 701/100; 701/30.2; 701/30.3; 701/31.9; 702/185

(58) Field of Classification Search ............... 701/1, 29, 701/30, 31, 34, 35, 29.1, 99, 100, 106, 30.2, 701/30.3, 30.8, 30.9, 31.1, 31.7, 31.8, 31.9, 701/32.1, 102, 103, 29.2; 702/179, 181–185; 340/945, 963, 971; 244/53, 75.1, 76 R
See application file for complete search history.

(56) References Cited

U.S. PATENT DOCUMENTS

| | | | |
|---|---|---|---|
| 4,617,630 A | 10/1986 | Zwicke | |
| 4,644,479 A | 2/1987 | Kemper | |
| 5,130,936 A | 7/1992 | Sheppard | |
| 5,293,323 A | 3/1994 | Doskocil | |
| 5,408,412 A | 4/1995 | Hogg | |
| 5,566,092 A | 10/1996 | Wang | |
| 5,951,611 A | 9/1999 | LaPierre | |
| 6,128,555 A | 10/2000 | Hanson | |
| 6,456,928 B1 | 9/2002 | Johnson | |
| 6,539,337 B1 | 3/2003 | Provan | |
| 6,909,960 B2 | 6/2005 | Volponi | |
| 7,233,884 B2 | 6/2007 | Volponi | |
| 2008/0097662 A1 | 4/2008 | Volponi | |
| 2008/0201104 A1* | 8/2008 | Poncet et al. | 702/181 |
| 2008/0228338 A1* | 9/2008 | Howard et al. | 701/29 |

OTHER PUBLICATIONS

U.S. Appl. No. 11/540,874, entitled "Empirical Tuning of an on Board Real-Time Gas Turbine Engine Model".
U.S. Appl. No. 11/657,323, entitled "Process for Adapting Measurement Suite Configuration for Gas Turbine Performance Diagnostics".
U.S. Appl. No. 11/605,724, entitled "State Initialization for Gas Turbine Engine Performance Diagnostics".
U.S. Appl. No. 11/601,213, entitled "Reducing Gas Turbine Performance Tracking Estimation Non-Repeatability".
U.S. Appl. No. 11/714,329, entitled "Process and Methodology for Root Cause Identification in Gas Turbine Engine Performance Tracking".
U.S. Appl. No. 11/641,566, entitled "Method and System for Identifying Gas Turbine Engine Faults".
U.S. Appl. No. 11/644,795, entitled "Gas Turbine Engine Performance Data Validation".
U.S. Appl. No. 11/843,193, entitled "Systems and Methods Involving Engine Models".

* cited by examiner

*Primary Examiner* — Thomas Tarcza
*Assistant Examiner* — Edward Pipala
(74) *Attorney, Agent, or Firm* — Carlson, Gaskey & Olds, PC

(57) ABSTRACT

A method and system is developed that provides a confidence measure of a prediction of a fault in a gas turbine engine. The confidence measure is developed based upon evaluating the results of a plurality of past predictions and comparing them to an actual fault.

20 Claims, 2 Drawing Sheets

|  | T49C2 DEG C | WF % | N2C2 % | N1C2 % | P25Q2 % | T25C2 DEG C | T3C2 DEG C | P3Q2 % |
|---|---|---|---|---|---|---|---|---|
| FAN | 3.86 | 0.70 | 0.30 | -0.68 | -2.00 | -1.95 | -1.58 | -0.03 |
| LPC | -4.54 | -0.66 | -0.29 | -0.14 | 1.18 | 0.11 | -2.62 | 0.01 |
| HPC | -6.80 | -0.80 | 0.06 | -0.05 | -0.83 | -0.71 | -3.66 | 0.17 |
| HPT | -10.88 | -1.29 | 0.57 | -0.08 | -1.29 | -1.14 | 4.03 | 1.26 |
| LPT | -1.19 | 0.96 | -0.63 | 0.98 | 3.40 | 3.45 | -1.42 | 0.11 |
| 2.5 BLD | -3.07 | -0.49 | -0.16 | 0.00 | 1.04 | 0.85 | -0.86 | 0.00 |
| FP14 | 1.22 | 0.21 | 0.07 | -0.24 | -0.67 | -0.73 | 0.15 | -0.01 |
| FP8 | -0.61 | -1.39 | -0.17 | -0.64 | -1.06 | -1.31 | -2.62 | -1.09 |
| 2.9 BLD | -4.22 | -1.06 | -0.29 | -0.06 | 0.68 | 0.63 | 0.60 | 0.02 |
| TCC | 17.75 | 2.10 | -0.90 | 0.12 | 2.14 | 1.86 | -4.38 | -1.11 |
| HPCSVM | -0.95 | -0.11 | 0.39 | 0.00 | -0.08 | -0.09 | 0.34 | 0.09 |
| P49 ERROR | -0.33 | -1.70 | -0.25 | -0.46 | -0.55 | 0.63 | -0.21 | -1.22 |

FIG.1
Prior Art

METHOD FOR CALCULATING CONFIDENCE ON PREDICTION IN FAULT DIAGNOSIS SYSTEMS

BACKGROUND OF THE INVENTION

This application relates to a fault diagnosis system.

Fault diagnosis of a gas turbine engine consists of two discrete stages, fault detection and fault isolation. Typically, these systems identify faults, and provide a maintenance worker with a likely location for a fault based upon a particular set of sensed system conditions.

A fault detection algorithm is responsible for monitoring engine sensors for sudden changes, which would indicate some amount of damage may have been sustained by the engine. The magnitude of the change in each sensor is passed on to a fault isolator, which determines the likely cause of the measured shift in the sensor readings. The fault isolator then directs a ground technician to the likely location of the damage. One type of fault isolation for a gas turbine engine is model-based. In such systems, a number of sensed conditions are developed, and a corresponding fault is predicted. These systems are often not based upon real world cases, but rather on computer modeling. In such systems, a vector of expected measurement shift magnitudes is created for each possible fault type. The measurement shift magnitudes represent the change in operating parameters that should correspond to that particular fault, and should be seen by the relevant sensors. These sets of measurement shift magnitudes are referred to as "fault signatures." A set of example faults and corresponding measured changes are provided in FIG. 1. Each value listed in FIG. 1 represents the sensed shift from a normal operating condition. Of course, these numbers are all simple examples.

In order to determine a cause of a sudden change in engine performance, the fault signatures of FIG. 1 are each projected onto a vector of measurement shift magnitudes. A measurement error is then calculated for each fault as the norm of the difference of the vectors, normalized by the measurement variance of each sensor. Mathematically, a measurement error can be calculated utilizing the following expression:

$$\sqrt{\sum_{i=1}^{m}\left(\frac{Measurement_i - FaultSignature_i}{SensorNoise_i}\right)^2},$$

where $Measurement_i$ is the measurement for sensor i from the engine to be isolated, $FaultSignature_i$ is a fault signature from the engine model for sensor i, $SensorNoise_i$ is the standard deviation of the measurements for sensor i, and m is the total number of sensors monitored.

In current practice, a measurement error is used as a measurement of goodness-of-fit. A large measurement error usually represents a poorly isolated fault. Once an error is calculated for each fault signature, the errors are ranked from smallest to greatest and the smallest error is selected as the most likely cause of the shift. However, this is an imperfect measure of appropriate confidence in a predicted fault, because it does not take into account other potential faults that may be close to the predicted fault. In other words, this method will always result in the identification of some fault as the likely cause, but it is often difficult to judge the accuracy of the system (how much confidence should be placed in the calculated results) using the measurement error alone.

In typical systems, there may be as many as 30 faults that must be distinguished by the eight sensors. In such systems, it is inevitable that some fault signatures appear very similar to others. These ambiguities reduce the overall accuracy of the system in certain regions of the input space.

Although a model-based approach to isolation, which is popular in the gas-turbine field, is discussed above, an alternative approach would be to implement an empirical system. In an empirical fault isolator, a generic computer or mathematical algorithm is presented with a large set of example fault cases, often collected from real world operation. From this data, the algorithm learns how to distinguish possible faults without any prior knowledge of the true engine model. Like the model-based method discussed above, some empirical approaches also generate some figure of isolation error. However, as in the model-based case, these approaches will always produce a prediction regardless of how ridiculous the input measurement vector. Therefore, the measurement or confidence measure output by the algorithm represents the confidence of the algorithm and its limited knowledge, not confidence in the algorithm itself.

When attempting to improve the current isolation methods, or to identify an alternative approach, the lack of a single unifying confidence measure across all of the different possible isolation methods complicates comparisons between isolation approaches. This problem is made worse when the results of several different isolation algorithms are consulted before coming to a final decision. As an example, it has been proposed recently to combine model-based with empirical fault isolation systems. Developing a confidence measure for these combined systems will be complicated based upon the prior art because the error and confidence measures provided inherently in each approach are each different and cannot easily be combined in a meaningful fashion.

SUMMARY OF THE INVENTION

In a disclosed embodiment of this invention, a system is developed to predict the likely fault based upon a plurality of predicted faults, and their resultant accuracy. When future faults are predicted, a confidence measure based upon the comparison of predicted results and actual accuracy is provided such that a maintenance worker has an indication of the likelihood of accuracy of an isolation system with the future predicted fault.

These and other features of the present invention can be best understood from the following specification and drawings, the following of which is a brief description.

BRIEF DESCRIPTION OF THE DRAWINGS

FIG. 1 is a graph showing a plurality of potential faults, and a plurality of sensed conditions that might be indicative of those faults.

DETAILED DESCRIPTION OF THE PREFERRED EMBODIMENT

Figure 2:
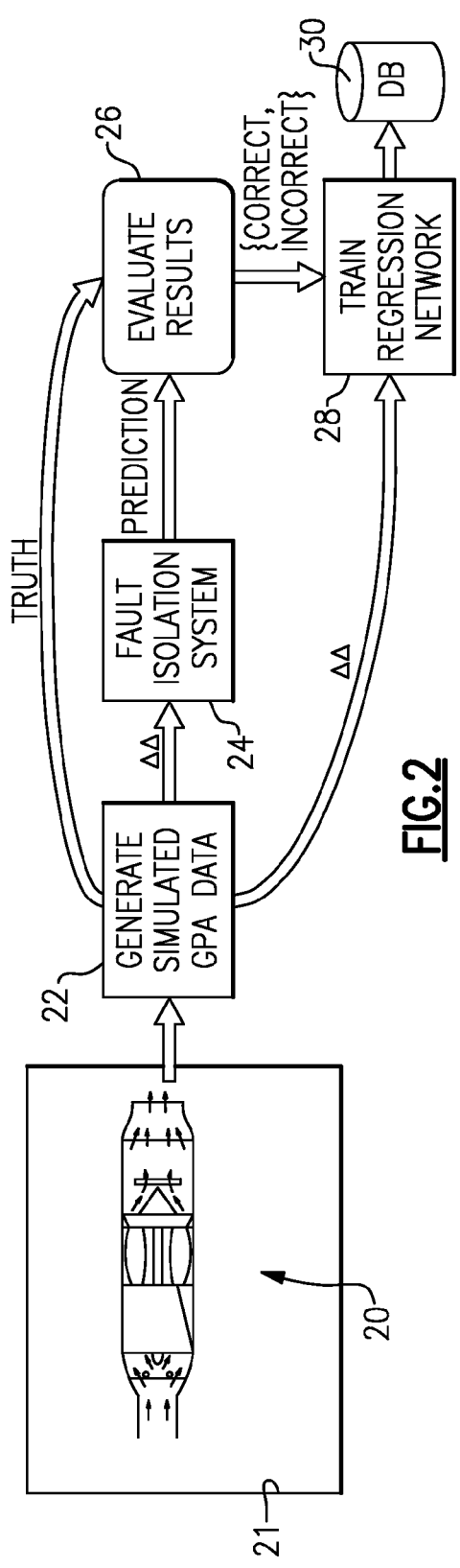
FIG. 2 is a schematic view of a model for developing a confidence measure according to this invention.

A mathematical model for a gas turbine engine 20 is developed such as on a computer 21.

The model-based system generates simulated data in box 22 to approximate a plurality of example sensed conditions. These conditions are then sent to a fault isolation system 24, which then makes a prediction as to which fault it believes was simulated. At the same time, the generated fault type and the predicted fault type are provided to a box 26 to evaluate the result. Box 26 then provides an answer of correct or incorrect to a train regression network 28, and the results are then stored in a database 30. Each correct or incorrect prediction will be associated with a 1 or 0, respectively, and the regression network will be trained based upon these results. As an example regression network, consider the Generalized Regression Neural Network (GRNN). In order to train this regression network, both the modeled measurement vectors generated by block 22 and respective evaluation results ("1" for correct and "0" for incorrect) are stored in a database 30.

While this example relies on an existing engine model to generate a large set of simulated faulty gas-path data points, real engine data may be used instead when available. Additionally, new examples may be added to the database at any time after the system is initially trained. For instance, if the system is originally trained using only model generated data, it could be beneficial to later add real operational data as it becomes available, gradually increasing the accuracy of the system further over time.

Figure 3:
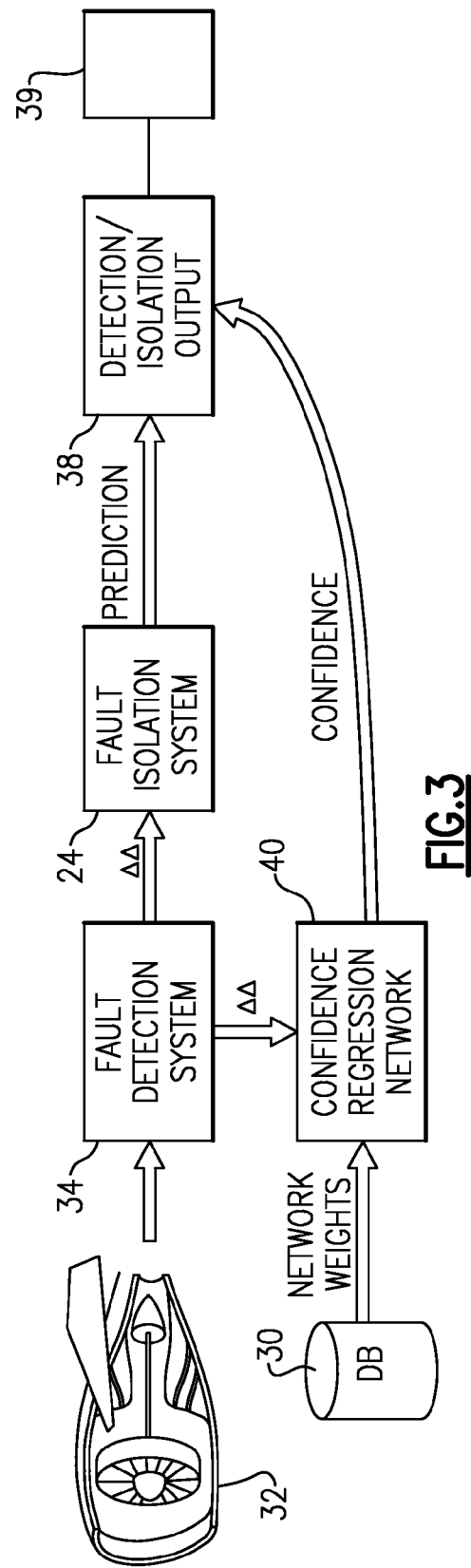
FIG. 3 shows a way of utilizing the developed confidence measure in real world systems.

As shown in FIG. 3, when utilized upon actual revenue engines 32, sensor data will be provided to a fault detection system 34. If an event is detected, the fault detection system 34 sends the shift magnitude of each measurement to a confidence regression network 40, which receives the data previously stored by the train regression network 28 from the database 30.

Returning to the GRNN regression network example, the confidence regression network 40 is calculated in three steps. First, the linear distance is calculated between the shift magnitudes received from the fault detection system 34 and each of the data points received from the database 30, using the following equation:

$$D_k = \sqrt{\sum_{i=1}^{m} (Measurement_i - StoredMeasurement_{i,k})^2},$$

where $Measurement_i$ is sensor i from the shift magnitudes received from 34, $StoredMeasurement_{i,k}$ is sensor i of stored data point k from the database 30, $D_k$ is the distance to measurement k, and m is the total number of sensors monitored. The algorithm next applies a kernel function, usually Gaussian, to these distances. Below is a simplified Gaussian kernel function, $$w_k = \exp\left(\frac{-D_k^2}{2h^2}\right),$$

where $w_k$ is the calculated weight for data point k and h is a tuning factor to adjust the standard deviation of the Gaussian kernel function. Finally, each of these weights, $w_k$, are multiplied by their respective accuracy votes (i.e., the "1" or "0" stored in the database 30 from the evaluate results 26 function when the regression network was originally trained). Thus, in the case of the GRNN regression network example, the final confidence is calculated as, $$Confidence = \frac{\sum_k (vote_k w_k)}{\left(\sum_k w_k\right) + BIAS},$$

where $vote_k$ is the "1" or "0" associated with data point k, Confidence is the output confidence from the algorithm, and BIAS is a positive bias applied to the denominator to ensure a low confidence if the shift magnitudes received are not near any previously encountered point (i.e., there should be little or no confidence where there is little or no experience). The output confidence is subsequently passed to the detection isolation output node 38 of FIG. 3.

From the fault detection system 34, the sensed variables are also sent to the fault isolation system 24, and the fault isolation results are also sent to the detection isolation output node 38. Then, a detection isolation output is provided at 38 to maintenance 39. Of course, the maintenance 39 may be a computer to display the result to actual maintenance personnel. The maintenance worker is provided not only with a predicted fault, but with a confidence measure associated with that prediction with respect to the confidence of the overall algorithm rather than the confidence of the algorithm in the selected fault in terms of the other possible faults.

As an example, a sudden and persistent shift is detected by the fault detection system monitoring a commercial engine in active service and the fault isolation system indicates that it is a likely fan performance issue (e.g., damaged blade or worn rub strip). However, when the confidence regression network evaluates the measurement shift magnitudes versus past experience with the isolation algorithm, the algorithm is found to be correct only half of the time when dealing with similar measurement shifts. Both the fan performance prediction and a confidence level of 0.5 (out of a range of zero to one, with one being the most confident) are provided to the maintenance personnel. When confronted with this low confidence level, the maintenance personnel performs additional low cost diagnostics or inspections on the engine hardware for both the indicated fault and other similar regions of the engine that may have caused a similar measurement shift profile, before committing to an expensive maintenance action. However, if a higher confidence was calculated for the fault isolation, the maintenance personnel may perform the indicated maintenance action with minimal additional diagnostics on the hardware. In a final case, the measurement shift magnitudes may not be anywhere near any previously examined examples or any of the known fault signatures, in which case the provided confidence will indicate a zero confidence in the results, which represent only a best guess.

Over time, additional test cases may be added to the system from commercially operating engines, allowing the confidence in regions of the input space to both rise and lower based on feedback from the maintenance personnel. As more test cases are passed through the system, the confidence regression network and the database will become increasingly accurate at estimating the isolation confidence.

The power of this improvement is that maintenance personnel will be provided with a confidence measure, and that the confidence in the isolation algorithm will be based on the particular measurement data received. If the predicted fault is one that will be very difficult to correct, such as something that may require the disassembly of large portions of the engine, and if the confidence level for the measured data is relatively low, the maintenance worker may choose to consider other possible predicted faults that may be easier to check before attempting to address the more expensive maintenance action. While improvements to the isolation algorithm should always be sought out first in the face of a region of low confidence, this algorithm is intended more to highlight difficulties in the isolation problem often stemming from ambiguities in the modeled fault signatures and due to measurement noise, which are very difficult to accommodate.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A fault diagnosis system comprising:
a fault detection system for taking in a plurality of sensor readings from a gas turbine engine;
said plurality of sensors providing readings to a fault isolation system, said fault isolation system predicting a current fault based upon said readings, and to a network communicating with a database of prior predictions, and the database associating the prior predictions with a confidence level for the current prediction; and
said fault isolation system providing the predicted current fault to an output, and the confidence level in the current prediction also being provided to the output.

2. The system as set forth in claim 1, wherein the database is developed, at least in part, using a model-based fault isolation system.

3. The system as set forth in claim 2, wherein a regression network is trained based upon the model-based fault isolation system to provide the confidence level.

4. The system as set forth in claim 3, wherein said regression network is trained by calculating a linear distance between shift magnitudes received from a fault detection system and each of the data points received from the database, using the following equation:

$$D_k = \sqrt{\sum_{i=1}^{m} (\text{Measurement}_i - \text{StoredMeasurement}_{i,k})^2},$$

where $\text{Measurement}_i$ is sensor i from the received shift magnitudes, $\text{StoredMeasurement}_{i,k}$ is sensor i of stored data point k from the database, $D_k$ is the distance to measurement k, and m is the total number of sensors monitored, then a Gaussian kernel function is applied to these distances, with the Gaussian kernel function being $$w_k = \exp\left(\frac{-D_k^2}{2h^2}\right),$$

where $w_k$ is the calculated weight for data point k and h is a tuning factor to adjust the standard deviation of the Gaussian kernel function, and each of these weights, $w_k$, are multiplied by a respective accuracy votes stored in the database, then a final confidence is calculated as, $$\text{Confidence} = \frac{\sum_k (\text{vote}_k w_k)}{\left(\sum_k w_k\right) + \text{BIAS}},$$

where $\text{vote}_k$ is the accuracy vote associated with data point k, Confidence is the output confidence from the algorithm, and BIAS is a positive bias applied to the denominator to ensure a low confidence if the shift magnitudes received are not near any previously encountered point.

5. The system as set forth in claim 2, wherein the database is also developed based upon actual examples of correct and incorrect predictions.

6. The system as set forth in claim 1, wherein the database is developed based upon actual examples of correct and incorrect predictions.

7. The system as set forth in claim 1, wherein the provided confidence level is in the form of a percentage chance that the predicted fault is an accurate fault.

8. The system as set forth in claim 7, wherein a bias factor is utilized to reduce the confidence level percentage if there are few or no previously encountered data points which closely resemble the current data point.

9. The system as set forth in claim 1, wherein the database associates the prior predictions with said confidence level at least in part utilizing the accuracy of said prior predictions.

10. The system as set forth in claim 1, wherein said output is a computer.

11. A method of operating a fault prediction system including the steps of:
(a) taking in a plurality of sensor readings from a gas turbine engine;
(b) providing readings to a fault isolation system, and predicting a current fault based upon said readings to a network communicating with a database of prior predictions, the database associating the prior predictions with a confidence level in the current prediction; and
(c) said fault isolation system providing the predicted current fault to an output, and the confidence level in the current prediction also being provided to the output.

12. The method as set forth in claim 11, wherein the database is developed, at least in part, using a model-based fault isolation system.

13. The method as set forth in claim 12, wherein a regression network is trained based upon the model-based fault isolation system to provide the confidence level.

14. The method as set forth in claim 13, wherein said regression network is trained by calculating a linear distance between shift magnitudes received from a fault detection system and each of the data points received from the database, using the following equation:

$$D_k = \sqrt{\sum_{i=1}^{m} (\text{Measurement}_i - \text{StoredMeasurement}_{i,k})^2},$$

where $\text{Measurement}_i$ is sensor i from the received shift magnitudes, $\text{StoredMeasurement}_{i,k}$ is sensor i of stored data point k from the database, $D_k$ is the distance to measurement k, and m is the total number of sensors monitored, then a Gaussian kernel function is applied to these distances, with the Gaussian kernel function being $$w_k = \exp\left(\frac{-D_k^2}{2h^2}\right),$$

where $w_k$ is the calculated weight for data point k and h is a tuning factor to adjust the standard deviation of the Gaussian kernel function, and each of these weights, $w_k$, are multiplied by a respective accuracy votes stored in the database, then a final confidence is calculated as, $$\text{Confidence} = \frac{\sum_k (\text{vote}_k w_k)}{\left(\sum_k w_k\right) + \text{BIAS}},$$

where $\text{vote}_k$ is the accuracy vote associated with data point k, Confidence is the output confidence from the algorithm, and BIAS is a positive bias applied to the denominator to ensure a low confidence if the shift magnitudes received are not near any previously encountered point.

15. The method as set forth in claim 12, wherein the database also is developed utilizing actual examples of correct and incorrect predictions.

16. The method as set forth in claim 11, wherein the database is developed utilizing actual examples of correct and incorrect predictions.

17. The method as set forth in claim 11, wherein the provided confidence level is in the form of a percentage chance that the predicted fault is an accurate fault.

18. The method as set forth in claim 17, wherein a bias factor is utilized to reduce the confidence level percentage if there are few or no previously encountered data points which closely resemble the current data point.

19. The method as set forth in claim 11, wherein the database associates the prior predictions with said confidence level at least in part utilizing the accuracy of said prior predictions.

20. The method as set forth in claim 11, wherein the output is a computer.

* * * * *